(12) United States Patent
Fatemi et al.

(10) Patent No.: US 11,575,283 B2
(45) Date of Patent: Feb. 7, 2023

(54) MODULAR SCALABLE ELECTRIC MACHINE

(71) Applicant: GM GLOBAL TECHNOLOGY OPERATIONS LLC, Detroit, MI (US)

(72) Inventors: Alireza Fatemi, Canton, MI (US); Thomas W. Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 78 days.

(21) Appl. No.: 16/589,583

(22) Filed: Oct. 1, 2019

(65) Prior Publication Data

US 2021/0099034 A1   Apr. 1, 2021

(51) Int. Cl.

| | |
|---|---|
| *H02K 1/16* | (2006.01) |
| *H02K 1/02* | (2006.01) |
| *H02K 1/27* | (2022.01) |
| *H02K 11/33* | (2016.01) |
| *H02K 15/02* | (2006.01) |
| *H02K 17/12* | (2006.01) |
| *H02K 21/14* | (2006.01) |
| *H02K 1/276* | (2022.01) |

(52) U.S. Cl.
CPC ............... *H02K 1/16* (2013.01); *H02K 1/02* (2013.01); *H02K 1/276* (2013.01); *H02K 11/33* (2016.01); *H02K 15/024* (2013.01); *H02K 17/12* (2013.01); *H02K 21/14* (2013.01)

(58) Field of Classification Search
CPC .......... H02K 1/16; H02K 11/33; H02K 21/14; H02K 15/024; H02K 1/02; H02K 17/12; H02K 1/276; H02K 2213/09; H02K 17/20; H02K 3/28; H02K 2213/03; H02K 1/246; H02K 1/2766
USPC ........................................................ 310/68 D
See application file for complete search history.

(56) References Cited

U.S. PATENT DOCUMENTS

| | | | |
|---|---|---|---|
| 9,455,605 B2* | 9/2016 | Saito ....................... | H02K 21/14 |
| 9,692,261 B2* | 6/2017 | Nemoto ................ | H02K 21/14 |
| 10,411,532 B2* | 9/2019 | Lee ......................... | H02K 1/246 |

(Continued)

OTHER PUBLICATIONS

Dis.uniroma1.it ("Optimal design of electric motors"), printed on Oct. 27, 2021.*

*Primary Examiner* — John K Kim
(74) *Attorney, Agent, or Firm* — Quinn IP Law

(57) ABSTRACT

A modular stator-inverter assembly for an electric machine includes a stator and a traction power inverter module ("TPIM"). The stator includes a stator core having a center axis, an inner diameter ("ID"), an outer diameter ("OD"), and electrical conductors forming stator windings. Stator teeth extending radially toward the center axis from the ID collectively define stator slots occupied by the stator windings. Each adjacent pair of stator teeth defines a respective stator slot. The TPIM delivers a polyphase voltage to the stator windings to generate a predetermined number of stator poles, such that the stator has either two, three, or four of the stator slots per electric phase per stator pole. The stator defines a center cavity and is configured to receive a selected rotor from an inventory of preconfigured machine rotors. The inventory includes multiple synchronous reluctance machine rotors and an induction machine rotor.

20 Claims, 6 Drawing Sheets

(56) References Cited

U.S. PATENT DOCUMENTS

| | | | |
|---|---|---|---|
| 2015/0102699 A1* | 4/2015 | Mathoy | H02K 3/14 310/213 |
| 2015/0295455 A1* | 10/2015 | Nemoto | H02K 21/14 310/216.094 |
| 2016/0173019 A1* | 6/2016 | Dajaku | H02P 27/04 310/71 |
| 2017/0187257 A1* | 6/2017 | Liu | H02K 1/2766 |
| 2021/0099034 A1* | 4/2021 | Fatemi | H02K 1/276 |

* cited by examiner

MODULAR SCALABLE ELECTRIC MACHINE

INTRODUCTION

Rotary electric machines such as electric motors, generators, and combined motor/generator units have a rotor and a stator. Within the stator, radially-projecting stator teeth are equally spaced around a circumferential inner surface of a cylindrical stator core. Adjacent stator teeth are separated from each other by a stator slot. In order to construct the individual stator windings of the stator, the stator teeth are wound with strands of wire to fill the stator slots, or the stator slots are filled with copper bar "hairpin" segments.

In alternating current ("AC")/polyphase traction motor embodiments of a rotary electric machine, an AC input voltage is applied to the stator windings to generate a rotating stator field. The rotating stator field interacts with the magnetic field of the rotor to produce and sustain tangential forces within a radial stator-rotor airgap, with such forces ultimately imparting rotation to the rotor. Output torque resulting from such rotation may be harnessed using mechanical gear sets or pulleys and thereafter used to perform useful work within a system.

SUMMARY

The present disclosure relates to a modular rotary electric machine providing scalable torque and power capabilities for use across a range of applications. As will be appreciated by those of ordinary skill in the art, the hardware components of a given electric machine are typically configured for a particular application. That is, different mobile platforms tend to require electric machines that satisfy specific torque and power capabilities. This in turn necessitates the construction of a unique stator, rotor, and power inverter configuration. The present approach avoids the need for such construction and simplifies the construction process of an electric machine by using a common stator-inverter assembly, i.e., a stator and traction power inverter module ("TPIM"), both of which tend to be the greatest contributors to the overall cost and manufacturing complexity of the electric machine. The modularity contemplated herein refers to the ability to use various rotors with the stator-inverter assembly, with the configuration of the stator-inverter assembly being such that, without modification, a particular rotor selected from an inventory of pre-configured rotors may be used with the stator-inverter assembly to provide a desired torque and power capability.

The stator-inverter assembly of the present disclosure is optimized for use across multiple different applications. To enable the desired level of modularity and functionality as contemplated herein, the stator-inverter assembly uses a particular size, pole-slot combination, magnet type and layout, winding configuration, and other geometrical features as set forth herein.

A particular embodiment of the stator-inverter assembly includes a stator and a TPIM. The stator includes a cylindrical stator core having a longitudinal center axis, an inner diameter ("ID"), and an outer diameter ("OD"), with the stator also including wire or hairpin electrical conductors and stator teeth. The electrical conductors collectively form stator windings for each electrical phase of the electric machine, e.g., three electrical phases in a typical embodiment. The stator teeth are connected to the ID of the stator core, extend radially toward the longitudinal center axis of the stator core, and collectively define stator slots. Each stator slot is occupied by the stator windings, with each adjacent pair of stator teeth defining a respective one of the stator slots.

In this embodiment, the TPIM is configured to deliver a polyphase voltage to the stator windings to generate a predetermined number of stator poles, such that the stator has either two, three, or four of the stator slots per electric phase per stator pole of the electric machine. The stator defines a center cavity that is radially-inward of the stator teeth and configured to receive a selected machine rotor from an inventory of preconfigured machine rotors. Each rotor provides the electric machine with predetermined capabilities, for instance two, three, or four flux barrier layers for some of the rotor configurations or a cage for other configurations, for predetermined power and torque capability. The inventory of preconfigured rotors disclosed herein includes multiple synchronous reluctance ("SynR") rotors providing the above-noted flux barriers and an induction machine ("IM") rotor providing the above-noted cage.

The stator may have at least six of the stator poles, and possibly fifty-four of the stator slots. The stator may have an OD of in the range of 150 mm-200 mm and an ID in the range of 90 mm-140 mm. The stator and each of the rotors has an axial length of 75 mm-150 mm in this embodiment.

The SynR rotors may include a permanent magnet ("PM")-assisted SynR rotor having high-energy rotor magnets, e.g., Neodymium Iron Boron ("NdFeB") or Samarium Cobalt ("SmCo"), a PM-assisted SynR rotor having low-energy rotor magnets, e.g., Ferrite, and a SynR rotor that is not PM-assisted, and thus is characterized by an absence of high-energy or low-energy rotor magnets.

In the first of the PM-assisted SynR rotors, the high-energy magnets may include first and second sets of interior permanent magnets forming two trapezoidal flux barrier layers. The first set of interior permanent magnets is tangentially arranged with respect to an outer diameter of the rotor. The second set of interior magnets extends between the outer and inner diameters of the rotor to form a plurality of deep-V or "delta magnet" configurations, as such terms are used in the art. Adjacent magnets of the second set of interior magnets together define a V-angle of 5° to 10°, with the distal ends of the adjacent magnets being separated from each other by a distance of 5 mm-15 mm.

For the second PM-assisted SynR rotor using the low-energy magnets, the low-energy magnets may include three one-piece block magnets stacked with respect to and separated from each other to extend in a radial direction between an inner and outer diameter of the second rotor. Multiple three-layer flux barriers result from the stacks, and innermost magnets of an adjacent pair of the magnets define the above-noted V-angle of 5° to 10°. Distal ends of the adjacent magnets are separated from each other by a distance of 5-15 mm.

The third of the SynR rotors, which is "magnetless" as noted above, includes four flux barrier layers defined by a star-shaped ferrous rotor core and trapezoidal-shaped rotor bars. The star-shaped ferrous core is mounted to the rotor shaft and includes six triangular members mounted to and extending radially from the rotor core. Generally triangular or wedge-shaped air gaps are defined between each adjacent pair of the triangular members. The trapezoidal-shaped rotor bars, which are of a progressively-decreasing size and circumferential span, are disposed in the air gaps between adjacent pairs of the triangular members. The triangular members taper toward the outer diameter of the rotor to a width of 3 mm-8 mm.

The IM rotor in an embodiment includes at least sixty-two rotor bars, which may be constructed of aluminum or copper in two possible configurations. The rotor bars are equally-spaced from each other around the perimeter of the rotor, and extend along a longitudinal axis of the rotor. Each rotor bar is 2 mm-4 mm in width around the perimeter, 15 mm-20 mm in depth, i.e., along a radial direction of the rotor, and 70 mm-150 mm in length along the longitudinal axis.

Some embodiments of the stator may have fifty-four of the stator slots and six magnetic poles, and two layers with three turns per winding/coil, two parallel paths, and a throw of nine of the slots.

An electric machine is also disclosed herein having the stator-inverter assembly and a rotor selected from the above-noted inventory of preconfigured rotors. Additionally disclosed herein is a method for constructing the electric machine using the modular stator-inverter assembly.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
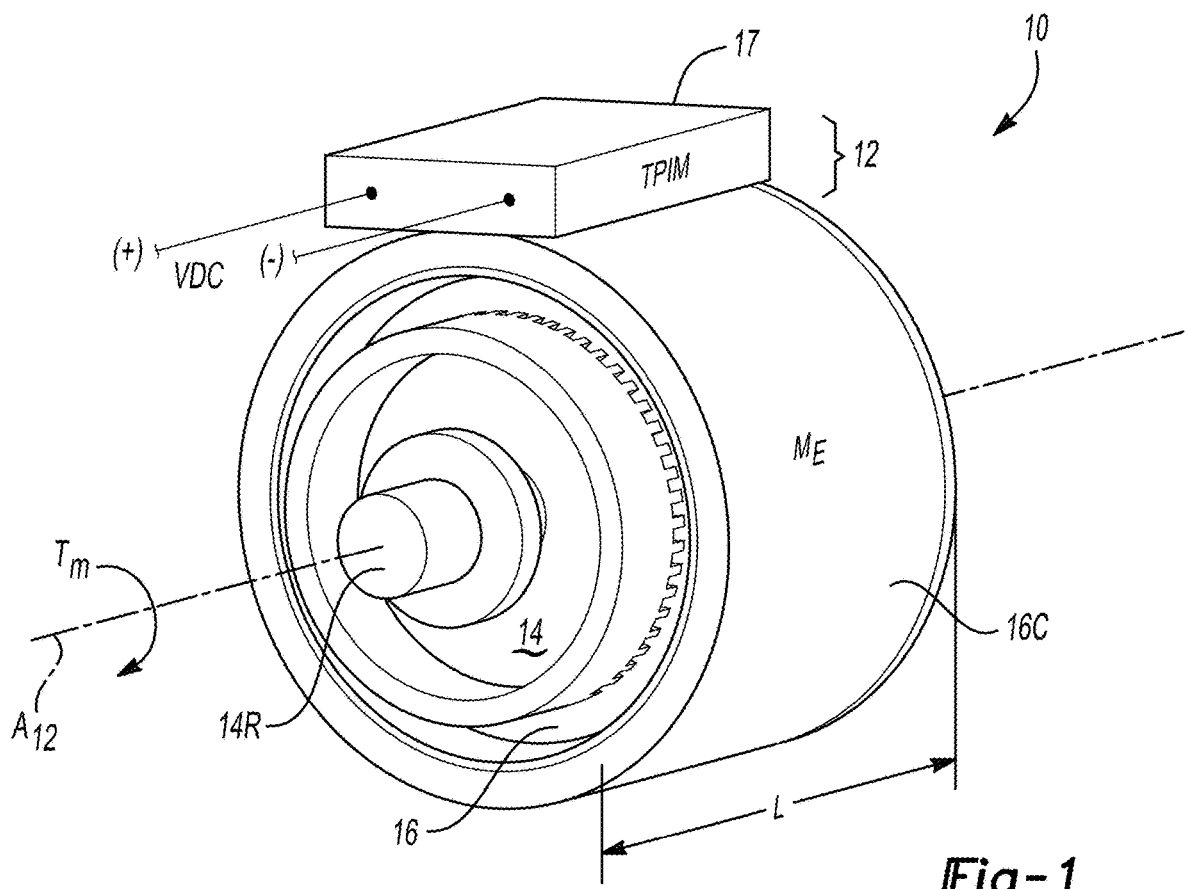
FIG. 1 is a schematic perspective view illustration of a modular rotary electric machine with scalable power capabilities and a universal stator/power inverter assembly usable with multiple different rotors according to the present disclosure.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, a modular rotary electric machine ("ME") 10 having a length L is depicted schematically in FIG. 1. The electric machine 10 includes a stator-inverter assembly 12 and a rotor 14. The rotor 14 is circumscribed by and separated from a stator 16 of the stator-inverter assembly 12 by a radial stator-rotor airgap (not shown) such that the electric machine 10 is configured as a radial flux-type machine.

As described herein, the stator-inverter assembly 12 is universal, i.e., shared in common by a plurality of different rotors 14, with four example rotors 14A-14D shown in FIGS. 6-9, respectively. Such rotors 14A-D may be preconfigured and stored in an inventory of preconfigured rotors, each rotor of which is usable with the stator-inverter assembly 12 without modification. That is, the same stator-inverter assembly 12 is shared across different platforms or applications in order to satisfy platform-specific torque and power requirements, and without resorting to custom configuration of the stator-inverter assembly 12 for each application. In this manner, the electric machine 10 may reduce overall cost and manufacturing complexity relative to existing methods for manufacturing and stocking of electric machines, e.g., for use as propulsion traction motors aboard electric or hybrid electric vehicles, robots, or aboard other motorized platforms.

The stator-inverter assembly 12 includes a traction power inverter module ("TPIM") 17 and a cylindrical stator core 16C constructed of laminated steel. As will be appreciated by those of ordinary skill in the art, the TPIM 17 is an electronic device configured to convert a DC voltage ("VDC") provided to the TPIM 17 via positive (+) and negative (−) rails of a DC voltage bus, typically connected to a multi-cell rechargeable battery pack (not shown), into an AC voltage suitable for energizing individual phase windings of the stator 16. A typical power inverter includes multiple semiconductor switches, as will be appreciated, the duty cycles of which being controlled via pulse-width modulation ("PWM"), pulse-density modulation ("PDM"), or other switching control methods to generate an AC voltage. The AC voltage may be filtered prior to energizing the phase windings of the electric machine 10. When energized using the TPIM 17, the electric machine 10 generates output torque (arrow $T_M$) with respect to an axis $A_{12}$ of a rotor shaft 14R, and delivers the same to a driven member/load (not shown), for instance a connected drive axle and/or road wheels of a motor vehicle.

The present teachings are applicable to electric motors of various configurations. In a multi-axle vehicle application, for instance, a front-wheel drive unit may use permanent magnet motors to provide a given peak torque and power, e.g., 4000 Nm torque and 170 kW peak power at 300V, 192 kW at 350V, etc. A rear-wheel drive unit may require slightly more power, e.g., 5000 Nm, and/or higher peak power levels such as 250 kW at 250V. Electronic drive units may use induction motors to provide lower peak torques, such as 1500 Nm, or lower peak power levels, e.g., 75 kW at 300V. Other platforms may have a different number and/or combination of motors each with its own unique torque and power requirements. The present approach may facilitate the use of a common or universal stator-inverter assembly 12 to satisfy a range of requirements, with a manufacturer of the electric machine 10 simply installing a different one of the rotors 14A-14D of FIGS. 6-9 based on the torque and power requirements.

Referring to FIGS. 2-5, the stator core 16C defines a center cavity 16O, and has an outer diameter ("ODs") connected to or integrally formed with a plurality of radially-projecting stator teeth 18. As will be appreciated, adjacent stator teeth 18 are separated from each other by a corresponding space or stator slot 20. Each stator slot 20 is then filled with an electrical conductor 22, typically copper wires (FIG. 3) or bars/hairpins (FIG. 4), to thereby form stator windings 22 W around a perimeter of the stator core 16C.

When the stator windings 22 W are sequentially energized by the TPIM 17 of FIG. 1, the stator windings 22 W individually act as electromagnets. As will be appreciated by those of ordinary skill in the art, stator poles formed from the resulting rotating stator field interact with rotor poles of the rotor 14 to rotate the rotor shaft 14R of FIG. 1. The number, type, position, and/or relative orientation of optional permanent magnets used to provide the rotor field, which may vary with the application, ultimately influences how magnetic flux from the rotor 14 is directed into the stator core 16C.

Figure 2:
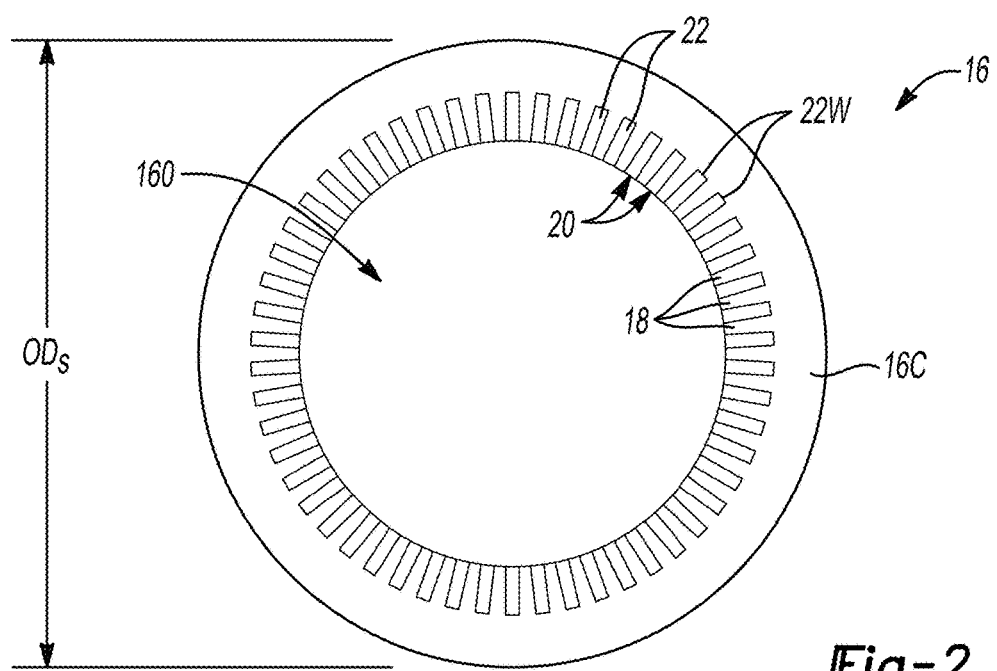
FIG. 2 is a schematic plan view illustration of a stator usable as part of the electric machine of FIG. 1.

In order to function optimally with each of the various rotors 14A-D described below with reference to FIGS. 6-9, without modifying the stator-inverter assembly 12, the stator 16 of FIG. 2 should conform to a predetermined set of design parameters. For instance, the outer diameter ("ODs") of the stator 16 may be in the range of 150 mm-200 mm in an optimized embodiment, and the length L of FIG. 1, i.e., the dimension projecting into the page of FIG. 2, is in the range of 75 mm-150 mm. Such a size would enable insertion of a rotor 14 having an outer diameter of 90 mm-140 mm, and a length that is likewise 75 mm-150 mm. The stator-inverter assembly 12 and the rotor 14 of FIG. 1 may be scaled in size to provide different torque and power capabilities, as will be appreciated, without affecting the modularity of the present design.

Additionally, the stator 16 shown schematically in FIG. 2, in an optimized embodiment for the speed ranges considered herein, has either six or eight poles, with the number of stator slots being either forty-eight or fifty-four. More specifically, the number of stator slots 20 per electrical phase per pole of the electric machine 10 is two, three, or four in different configurations. While other embodiments may be contemplated, such example parameters may be optimal for the applications described herein. In a non-limiting embodiment, the electric machine may use a 700V/300 Arms stator-inverter assembly with six poles, fifty-four slots, and six coil sides per stator slot 20, which may be optimized for operation with counterpart rotors 14 at 16,000 RPM and 24,000 RPM in possible configurations.

Figure 3:
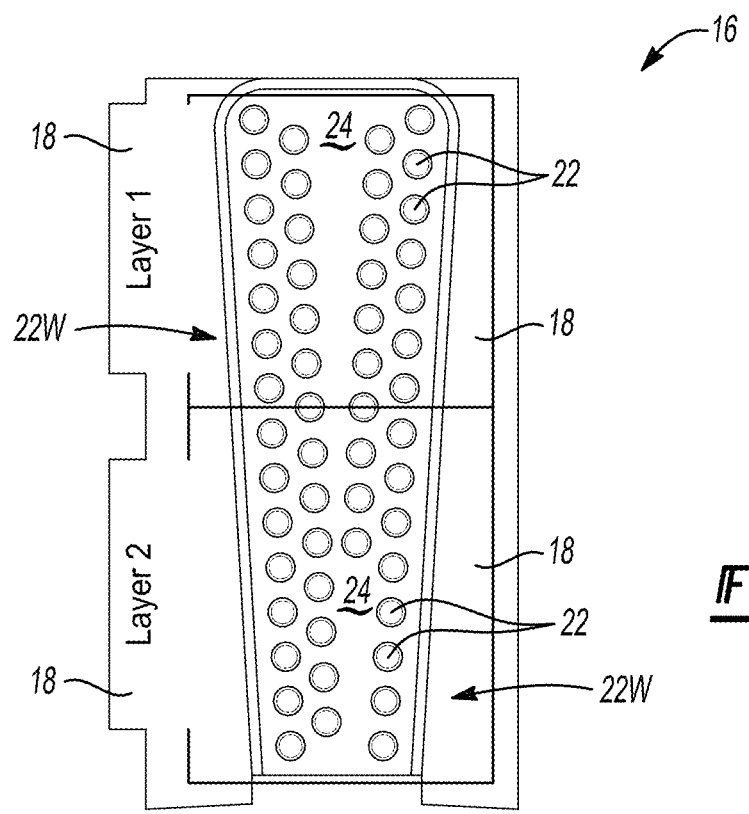
FIGS. 3 and 4 are schematic illustrations of respective stranded and hairpin-style stator windings according to the present teachings.
Figure 4:
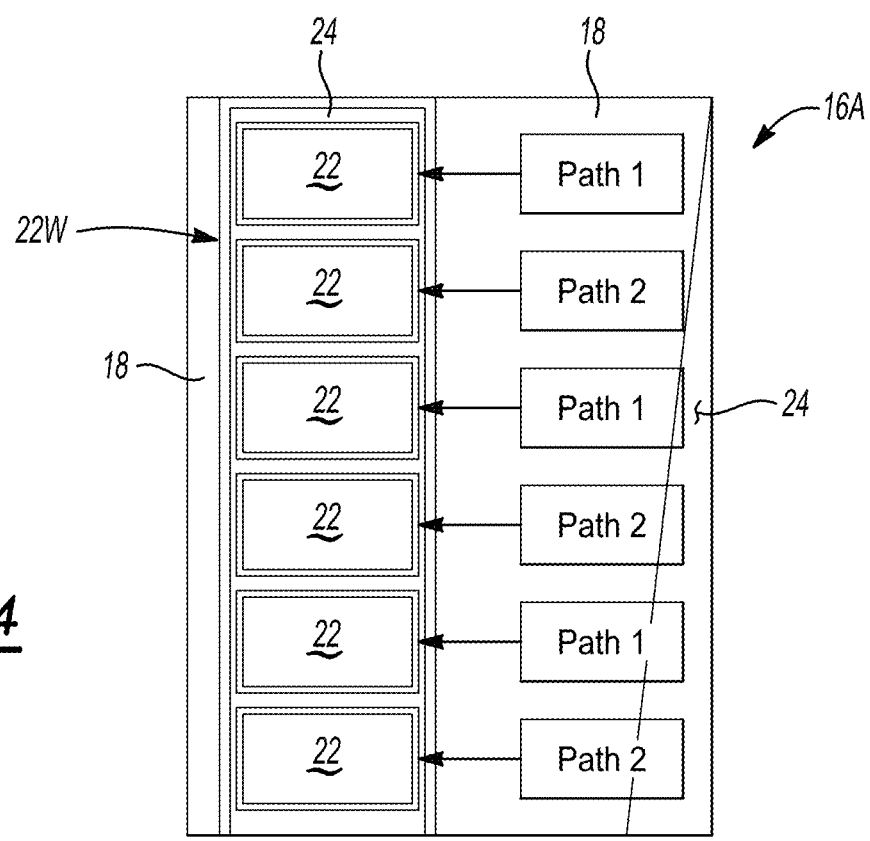
Figure 5:
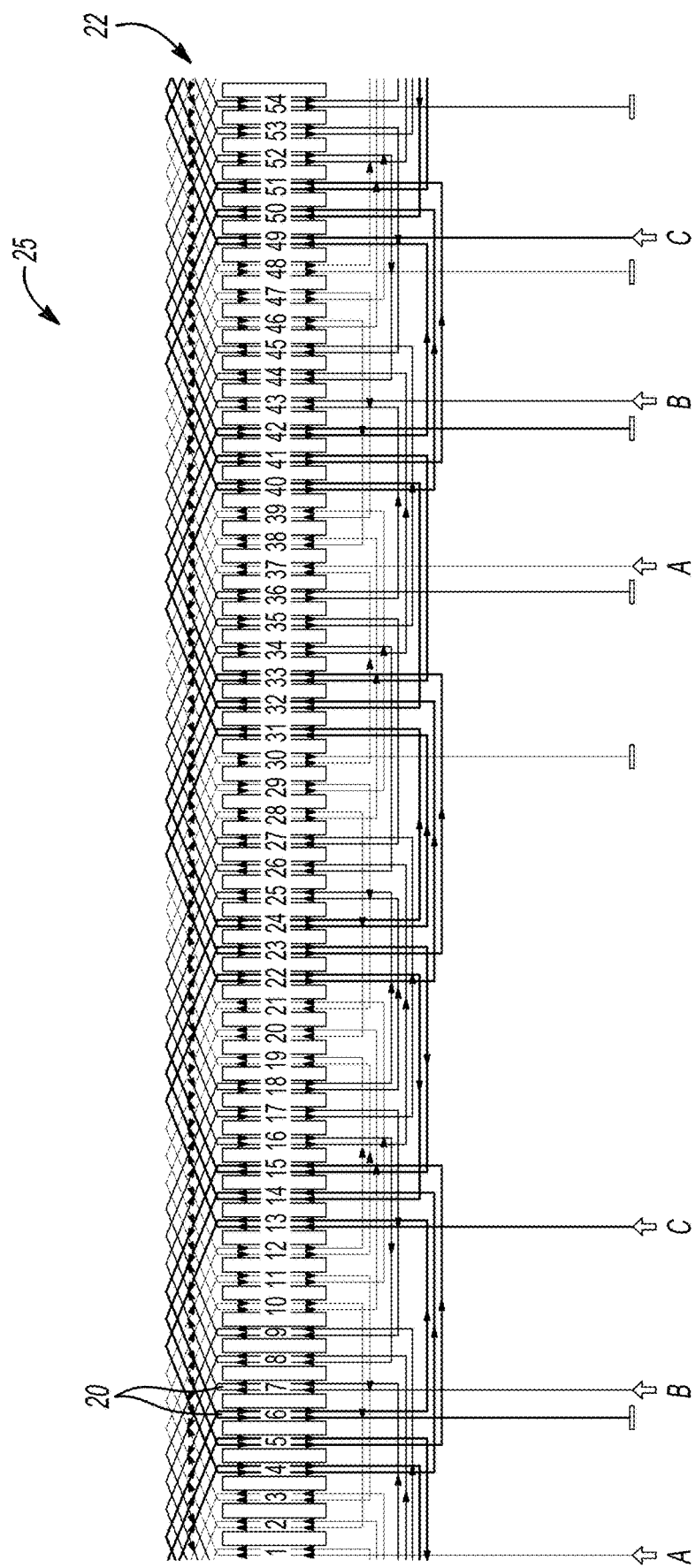
FIG. 5 is a schematic winding diagram for an embodiment of the stator of FIG. 2.

FIGS. 3 and 4 depict different exemplary construction options for implementing stator windings 22 W in the stator 16 of FIG. 2. FIG. 3 is a portion of a stator 16 in a possible multi-layer ("Layer 1", "Layer 2") arrangement in which electrical conductors 22 in the form of copper wires have a circular cross section, are insulated using varnish or another suitable insulating material 24, and are closely packed between adjacent stator teeth 18. The spacing between the electrical conductors 22 is exaggerated in FIG. 3 for illustrative clarity.

Alternatively, the stator 16A of FIG. 4 uses the electrical conductors 22 in the form of bar-type/hairpin conductors arranged with alternating current paths ("Path 1", "Path 2", etc.) as shown. The present teachings may therefore extend to either type of winding style of FIG. 3 or 4 without limitation, with an exemplary winding diagram 25 shown in FIG. 5 for manufacturing two coil layers of conductors 22 arranged in parallel paths within fifty-four stator slots 20 using three turns per stator winding 22 W, with three electrical phases (A, B, C) shown in FIG. 5 for an exemplary three-phase embodiment of the stator 16 and electric machine 10.

Figure 6:
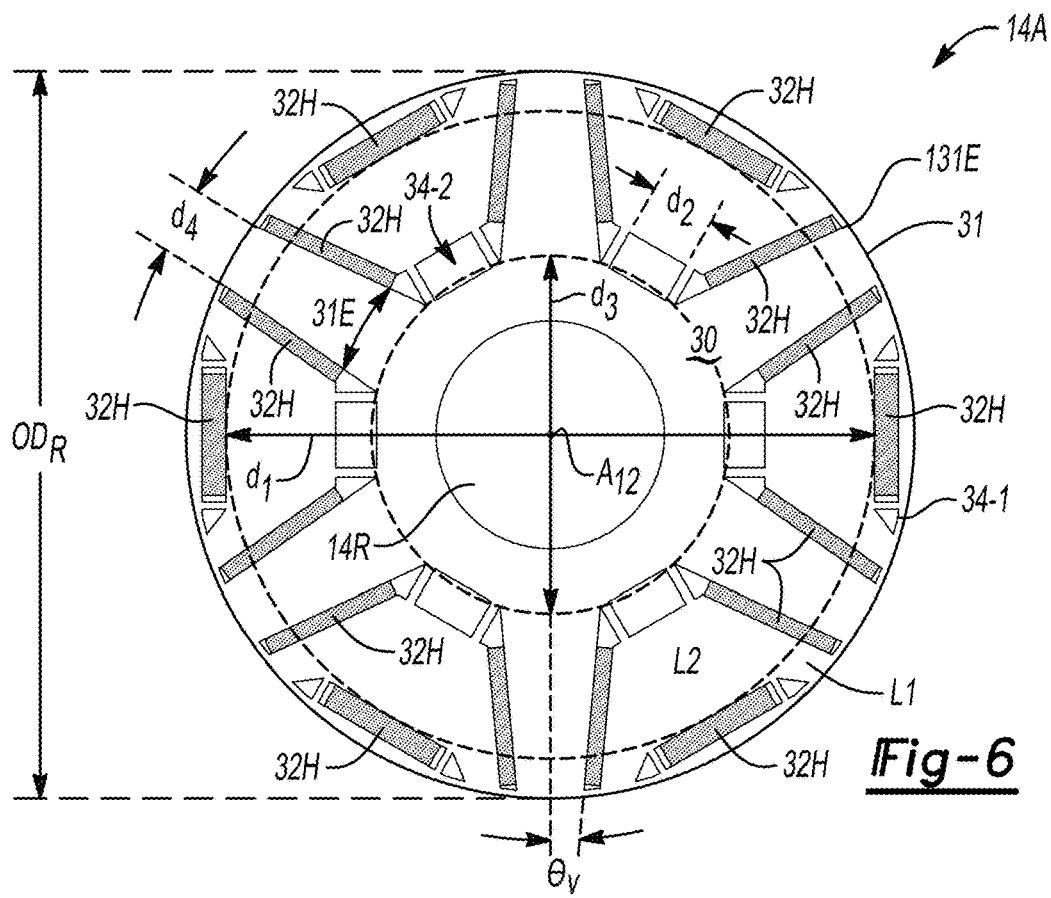
FIGS. 6-9 are schematic illustrations of different preconfigured rotors usable with the modular stator-inverter assembly of FIG. 2.
Figure 7:
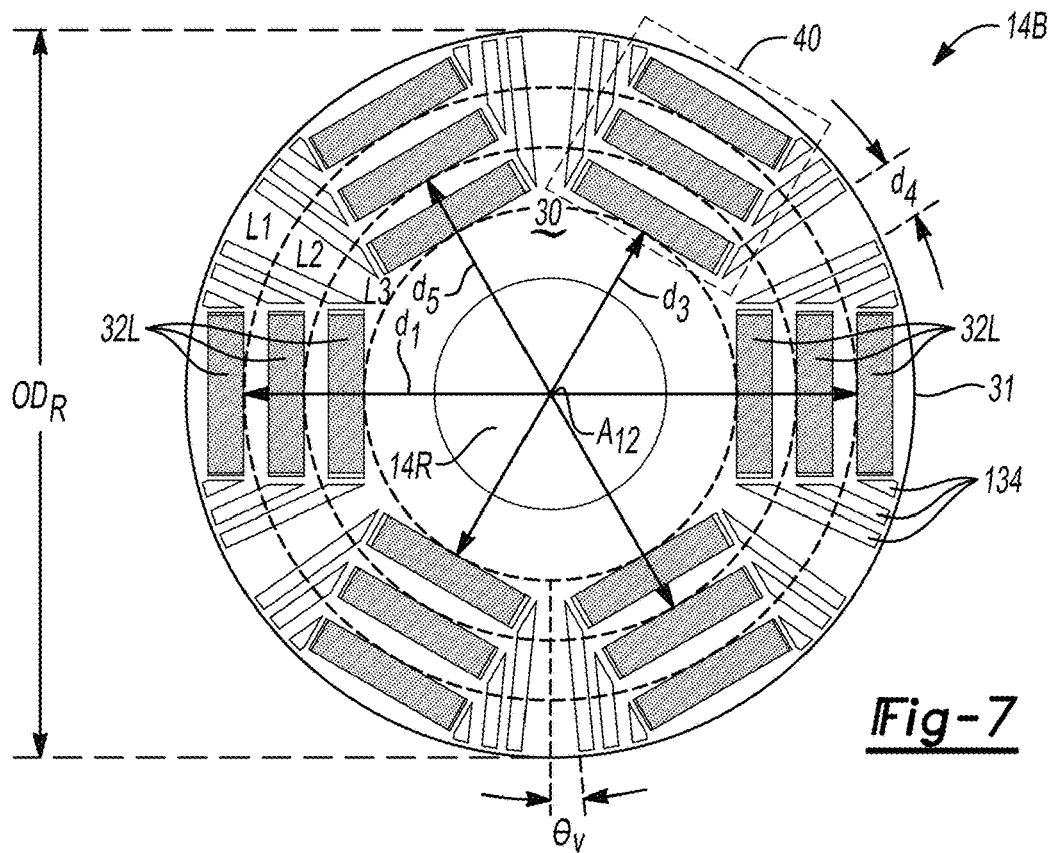
Figure 8:
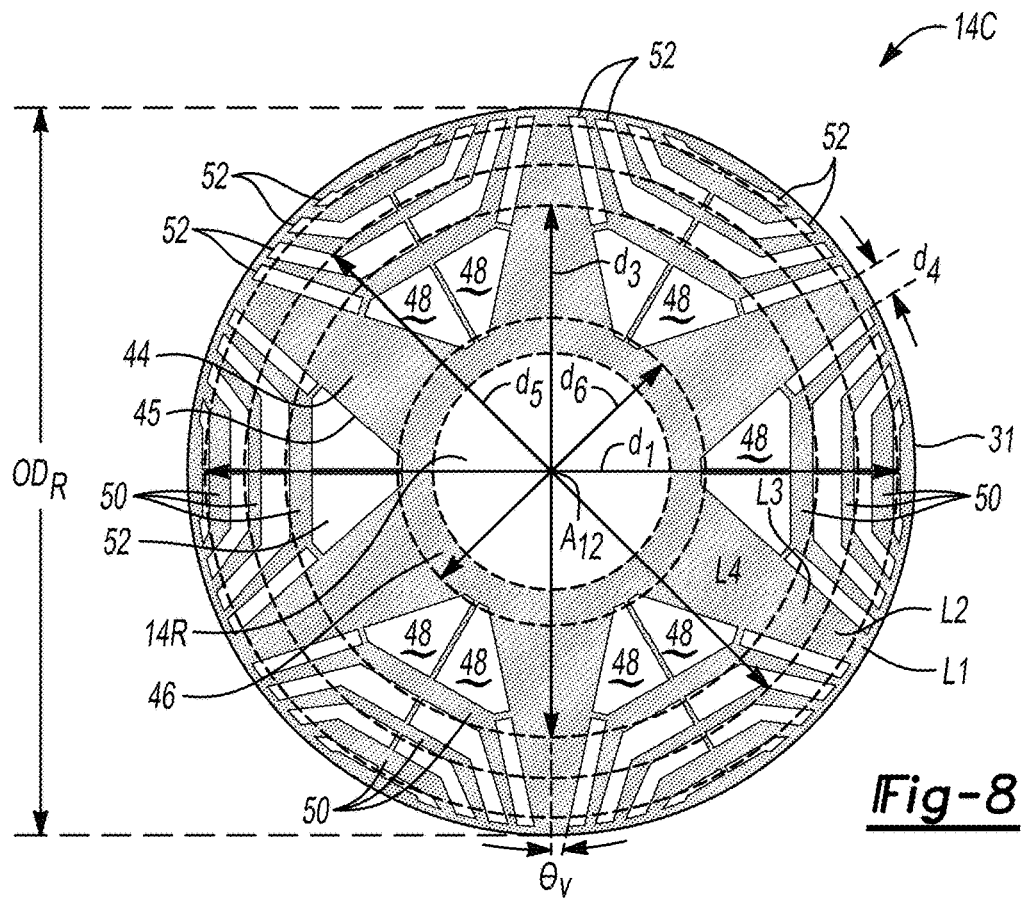
Figure 9:
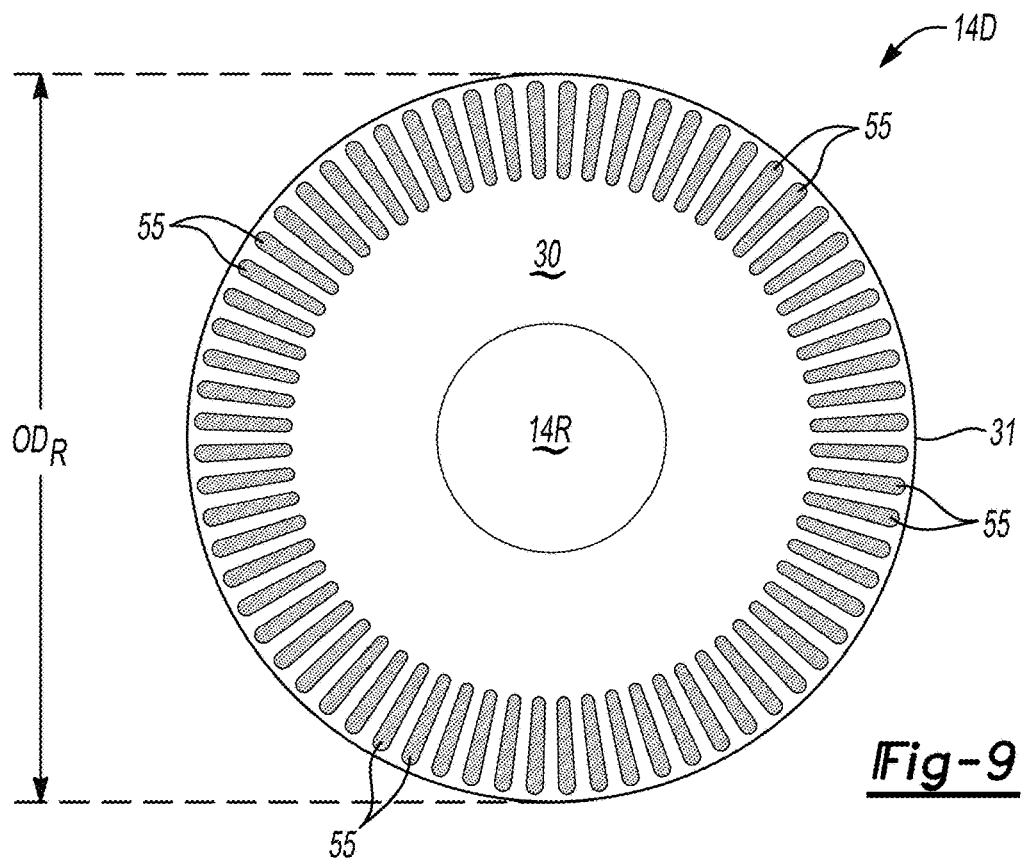

The modular rotors 14A, 14B, 14C, and 14D of respective FIGS. 6-9 share a common outer diameter ($OD_R$) of 90 mm-140 mm, and may have surface-mounted or embedded rotor magnets (FIGS. 6 and 7) or no rotor magnets (FIGS. 8 and 9). In the different embodiments, the rotor magnets may be embodied as "high-energy" rotor magnets, e.g., Neodymium Iron Boron (NdFeB) or Samarium Cobalt (SmCo) as shown in FIG. 6, or they may be "low-energy" magnets such as Ferrite (FIG. 7). As used herein, "low-energy" describes magnetic field strengths of about 0.3-0.5 Tesla (T), with "high-energy" being about 1-1.5 T or more. Thus, the present teachings may be used to realize performance tailored to a given need, as described below with reference to FIGS. 10 and 11.

Rotor Variations

Referring to FIG. 6, of the various rotors 14 stored in the inventory of preconfigured rotors noted above, rotor 14A may be embodied as a permanent magnet ("PM")-assisted synchronous reluctance machine ("SynR") rotor 14A. In the depicted embodiment, the rotor 14A includes a cylindrical rotor hub 30 constructed of laminated steel and embedded with high-energy rotor magnets 32H arranged in two layers, i.e., a first layer ("L1") and a second layer ("L2"). The rotor magnets 32H may be embodied as Neodymium Iron Boron (NdFeB), Samarian Cobalt (SmCo), or other rare-earth or other suitable high-energy magnets in order to provide the highest torque and power capabilities of the various configurations described herein. In the configuration of FIG. 6, the high-energy magnets 32H are configured as flat plate magnets and embedded to form generally trapezoidal flux barriers with a delta-PM layout as shown, as will be appreciated by those of ordinary skill in the art.

The rotor magnets 32H may be segmented and arranged in the two layers, i.e., the radially-outermost first layer L1 in which some the rotor magnets 32H are arranged tangentially to a circumferential outer wall 31 of the rotor hub 30 and spaced apart from each other to thereby surround the axis of rotation $A_{12}$, and the radially-inner second layer L2 in which the rotor magnets 32H are arranged in sets of three to form a respective "deep-V" configuration. The rotor magnets 32H of the first layer L1 are in the range of about 18 mm-25 mm in width by 3 mm-6 mm in height, with the width and height dimensions shown in FIG. 6, and with the rotor magnets 32H having an axial length, i.e., into the page, of 75 mm-150 mm or coextensive with the length L of the electric machine 10 shown in FIG. 1.

Diametrically-opposite rotor magnets 32H of the first layer L1 may be about 100 mm-130 mm apart (radial dimension $d_1$). Airgaps 34-2, e.g., rectangular airgaps having a width $d_2$ of 10 mm-20 mm, are defined by the rotor hub 30 between adjacent radially-innermost distal ends 31E of the rotor magnets 32H of the second layer L2. The airgaps 34-2 form rectangular flux barriers that are equally spaced around the perimeter of a circle of diameter (dimension $d_3$) of 50 mm-70 mm. Smaller additional triangular airgaps 34-1 may be present at opposing ends of each of the rotor magnets 32H used in the first and second layers L1 and L2.

Each of the rotor magnets 32H of the second layer L2, i.e., the deep V-layer, has a width of 20 mm-28 mm and a height of 3 mm-6 mm, with a length equal to the axial length of the electric machine 10 of FIG. 1. A V-angle $θ_v$ is defined between adjacent segmented pairs of the rotor magnets 32H in the second layer L2, with the V-angle being in the range of 5-10°. The q-axis bridge span (dimension $d_4$) extending between radially outermost ends 131E of the rotor magnets 32H is 5 mm-15 mm in the illustrated embodiment. The aforementioned dimensions $d_1$, $d_2$, $d_3$, and $d_4$ and the trapezoidal flux barrier arrangement of FIG. 6 thus provide enable the stator-inverter assembly 12 of FIG. 1 to use the first SR rotor 14A to build a PM-assisted synchronous reluctance machine embodiment of the electric machine 10 that is optimized for a particular torque and power performance, as described below with reference to FIGS. 10 and 11.

As an alternative to the high-energy/deep-V configuration of FIG. 6, the second rotor 14B of FIG. 7 is useable with the stator-inverter assembly 12 of FIG. 1 to form another PM-assisted SynR rotor in which low-energy rotor magnets 32L are used as interior magnets, e.g., block magnets constructed of Ferrite. In the depicted embodiment, the cylindrical rotor hub 30 is embedded with multiple stacks 40 of three such low-energy rotor magnets 32L, with six such stacks 40 shown in FIG. 7. Unlike FIG. 6, the rotor magnets 32L in the FIG. 7 embodiment are not segmented. The rotor magnets 32L are embedded in the interior of the rotor hub 30 to provide the highest drive-cycle efficiency of the various illustrated embodiments.

In particular, the rotor magnets 32L are stacked in three interior layers (L1, L2, L3) to form generally U-shaped or V-shaped flux barriers, with the rotor magnets 32L each being identically configured. In an exemplary embodiment, the rotor magnets 32L have a width of 10 mm-18 mm and a height of 3 mm-9 mm. As with the embodiment of FIG. 6, the rotor hub 30 has an axial length of 75 mm-150 mm (see FIG. 1) and an outer diameter ($OD_R$) of 90 mm-140 mm, and thus the axial length of the rotor magnets 32L is likewise 75 mm-150 mm. The V-angle $\theta_v$ between adjacent rotor magnets 32L remains in the range of 5–10°, as with the embodiment of FIG. 6, with the q-axis bridge (dimension $d_4$) between radially outermost ends 131E of the rotor magnets 32L remaining 5 mm-15 mm in this optimized embodiment.

Dimensions $d_1$, $d_5$, and $d_3$ respectively define the distance between oppositely-disposed rotor magnets 32L of the same layer L1, L2, or L3, with dimension $d_1$ between radially-opposite rotor magnets 32L of layer L1 being 95 mm-130 mm apart, dimension $d_5$ between radially-opposite rotor magnets 32L of layer L2 being 75 mm-90 mm apart, and dimension $d_3$ between radially-opposite rotor magnets 32L of layer L3 being 95 mm-130 mm apart in this embodiment. Radially-extending and elongated airgaps 134 of different sizes, e.g., three such airgaps 134, are defined by the rotor hub 30 between each adjacent pair of the stacks 40. Thus, the airgap 134 extending from the rotor magnet 32L in layer L1 toward surface 31 is shorter than the airgap 134 extending from the rotor magnet 32L in layer L2 toward surface 31, with the airgap 134 extending from the rotor magnet 32L in layer L2 toward surface 31 in turn being shorter than the airgap 134 extending from the rotor magnet 32L in layer L3 toward surface 31.

While the rotors 14A and 14B of respective FIGS. 6 and 7 illustrate two exemplary embodiments using rotor magnets 32H and 32L having different magnetic strengths in order to provide relative torque, power, or efficiency benefits, the present teachings may also be used with rotors characterized by an absence of permanent rotor magnets. Referring to FIG. 8, for example, the present teachings may be extended to a "magnetless" SynR rotor, i.e., third rotor 14C. Relative to the configurations depicted in FIGS. 6 and 7, the elimination of permanent magnets may help reduce cost and component count, and may enable uses in higher-temperature applications, as will be appreciated by those of ordinary skill in the art. Thus, "magnetless" refers to the absence of permanent magnets in the construction of the rotor 14C.

As shown, the rotor 14C of FIG. 8 may be a four-layer configuration providing four layers of flux barriers, i.e., layers L1, L2, L3, and L4. To form the four layers, a laminated star-shaped ferrous core 44 is mounted to a cylindrical inner hub 46 circumscribing the rotor shaft 14R, and may include multiple triangular members 45, e.g., six of the triangular members 45, each of which is mounted to and extends radially from the cylindrical inner hub 46 of diameter $d_6$, e.g., 40 mm-60 mm.

Triangular or wedge-shaped spaces 48 between adjacent triangular members 45 are occupied by trapezoidal rotor bars 50 of progressively-decreasing size and span, with the rotor bars 50 mutually separated by airgaps 52. The triangular members 45 taper toward the outer diameter of the rotor hub 30 such that the vertices/narrowest portions of the triangular members 45 at the outer diameter of the rotor hub 30 form the q-axis bridge span of 3 mm-8 mm (dimension $d_4$). The rotor hub 30 itself maintains the axial length and outer diameter of the previously described embodiments of FIGS. 6 and 7.

Referring to FIG. 9, the universal stator-inverter assembly 12 of FIG. 1 may also be used as part of an induction machine ("IM"). An IM rotor 14D is usable for this purpose to enable moderate power, efficiency, and cost relative to the above-described embodiments of FIGS. 6-8. As with the synchronous reluctance machine embodiment of the rotor 14C shown in FIG. 8, an induction machine likewise enables higher-temperature operation.

In the configuration of FIG. 9, the solid rotor hub 30 surrounding the rotor shaft 14R is embedded with multiple elongated rotor bars 55, e.g., with sixty-two, sixty-six, sixty-eight, seventy-four, or seventy-six being optimal numbers of such rotor bars 55 depending on the application. Each of the rotor bars 55 is configured as a rectangular plate having a width of 2 mm-4 mm and a depth of 15 mm-20 mm, with the width extending circumferentially and the depth extending radially in FIG. 9. The axial length of the rotor bars 55, as with the other embodiments, is 75 mm-150 mm as noted above, with the outer diameter ($OD_R$) of the rotor hub 30 remaining 90 mm-140 mm. In different embodiments, the rotor bars 55 may be constructed of aluminum or copper to provide relative benefits. As will be appreciated, aluminum is a lighter material that is generally less expensive than copper. However, aluminum has a lower conductivity relative to copper. Thus, the material used to construct the rotor bars 55 may be selected based on the application and desired properties.

Figure 10:
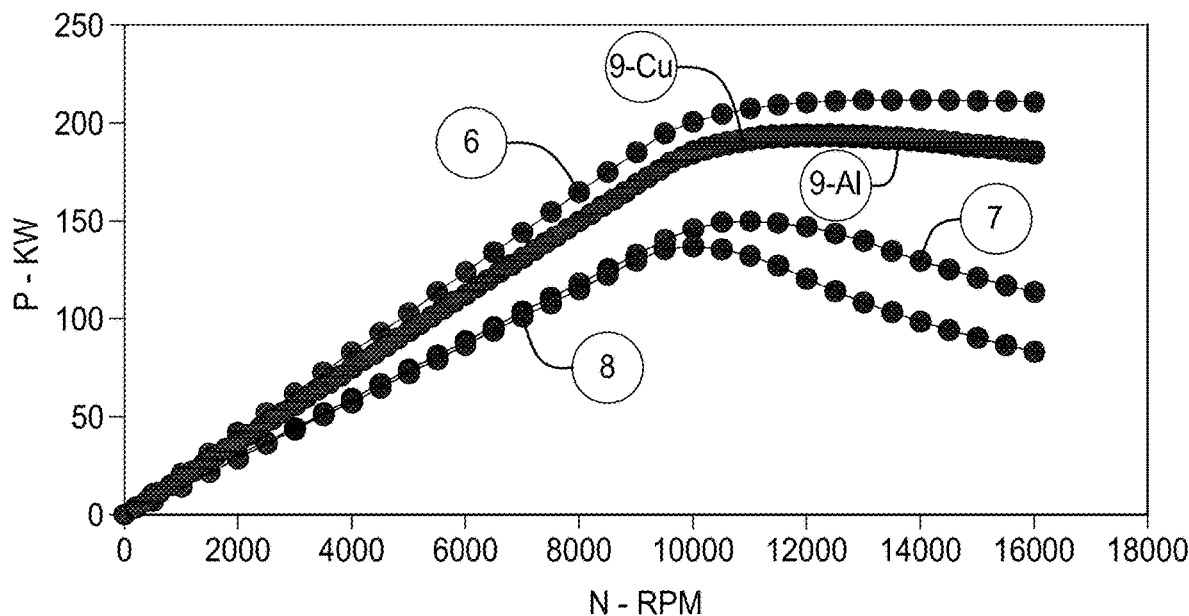
FIGS. 10 and 11 are plots of speed versus power and speed versus torque, respectively, for electric motors constructed using the various rotor configurations of FIGS. 6-9.
Figure 11:
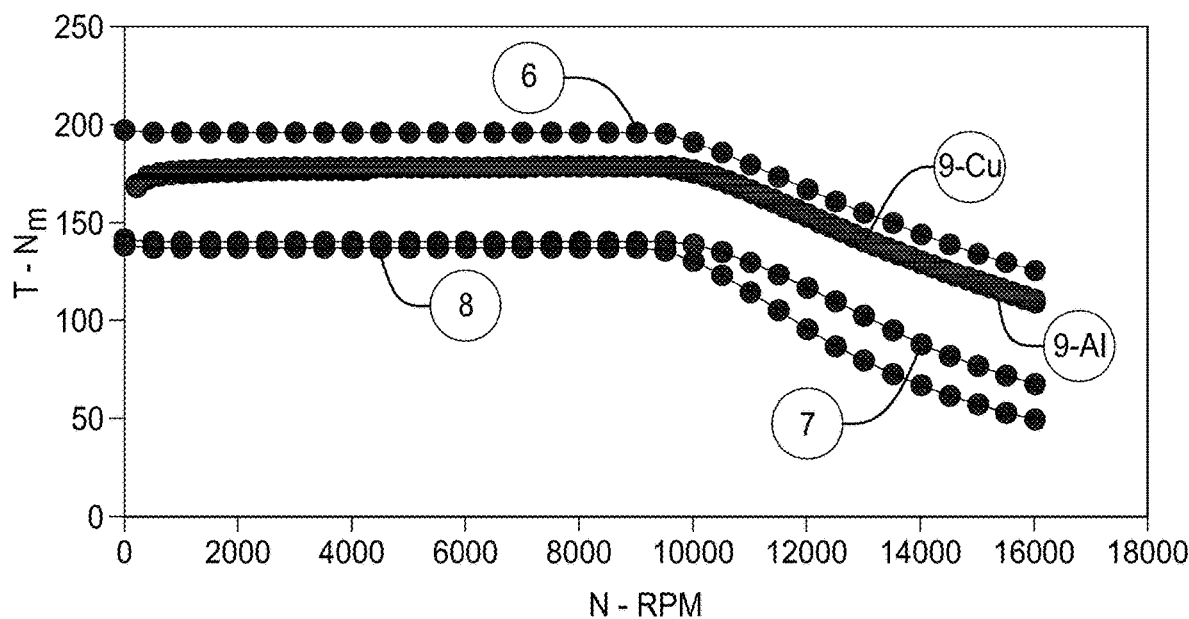

FIGS. 10 and 11 are respective power and torque plots, with rotary speed in RPM depicted on the horizontal axis and power in kilowatts ("P-kW") ((FIG. 10) or torque in Newton-meters ("Nm") (FIG. 11) depicted on the vertical axis. The relative benefits of the various embodiments of the rotor 14 are depicted when used with an exemplary embodiment of the stator-inverter assembly 12 shown in FIG. 1. In this example, a DC voltage of 700V is applied to the TPIM 17, and the stator 16 and TPIM 17 are sized to produce a maximum current of 300 Arms and a maximum speed of 16,000 RPM. Maximum torque-per-ampere ("MTPA") control is used in the control of each embodiment.

Referring to FIG. 10, the power performance of each of the four disclosed embodiments of the rotors 14A, 14B, 14C, and 14D of FIGS. 6-9 is depicted for the above-noted 16,000 RPM example configuration. Traces 6 and 7 refer to the high-energy and low-energy variations of the rotor shown in FIGS. 6 and 7, respectively, with the high-energy embodiment outputting about twice the power of low-energy variation at maximum speed. Thus, one could choose between the embodiments of FIGS. 6 and 7 based on the required use of the electric machine, with the lower-energy variation possibly being used in some applications for increased efficiency when the additional power capabilities are not required.

Trace 8 likewise corresponds to the variation of FIG. 8 in which permanent magnets are omitted from the rotor 14C, with performance of the FIG. 8 embodiment overlapping that of the low-energy embodiment of FIG. 7 (trace 7) up to about 10,000 RPM before falling behind by about 20-25 percent at higher speeds. Traces 9-Cu and 9-Al largely overlap and represent the respective copper and aluminum embodiments of induction machine embodiment of FIG. 9, which as shown provides a power capability that slightly lags that of the high-energy reluctance machine embodiment of FIG. 6 (trace 6), but that is more powerful than the remaining embodiments.

FIG. 11 is a set of torque curves providing additional performance information for comparing the various embodiments of FIGS. 6-9. Here, 6, 7, 8, 9-Cu, and 9-Al correspond to the torque performance of the electric machine 10 of FIG. 1 constructed using the rotors 14A-14D of FIGS. 6, 7, 8, and 9, respectively. As would be expected in view of FIG. 10, the relative torque performance of the high-energy reluctance machine of FIG. 6 (trace 6) provides the highest torque capability across the entire speed range of 0-16,000 RPM. This is followed closely by the induction machine of FIG. 9 (traces 9-Cu and 9-Al). Similar torque capabilities are provided up to about 10,000 RPM by the remaining embodiments, i.e., the low-energy reluctance machine of FIG. 7 (trace 7) and the reluctance machine of FIG. 8 (trace 8) lacking permanent magnets. Above 10,000 RPM, the low-energy embodiment of FIG. 8 provides about 30-40 percent more torque.

The present teachings enable a manufacturer to select a universal modular stator-inverter assembly 12 as shown in FIG. 1 for a given speed range, e.g., 16,000 RPM as shown in FIGS. 10 and 11, or 24,000 RPM in another embodiment. The manufacturer then selects an application-suitable one of the above-described rotors 14-14D of FIGS. 6-9 based on the required torque and power, and mates the rotor 14A, 14B, 14C, or 14D to the universal stator-inverter assembly 12, which may be preassembled with the TPIM 17 or later connected thereto. This allows the power or torque to be scaled without changing the stator-inverter assembly 12 and its associated TPIM 17.

Certain configurations have been optimized in the present disclosure to minimize the need for time consuming experimentation and optimization, and therefore the disclosed ranges and sizes are not necessarily limiting of the present teachings. In an embodiment, for instance, the electric machine may be configured as a six-pole or an eight-pole machine with forty-six or fifty-four slots, and with 2 or 3 slots per pole per phase. A fifty-four slot/six-pole embodiment is therefore an exemplary embodiment. Stated dimensions of the permanent magnets may change based on the size of the rotor hub 30 that is used, with the various embodiments of the rotors 14A-D noted above being 90 mm-140 mm in diameter and 75 mm-150 mm in axial length.

Using the present teachings, therefore, a modular approach to construction of the electric machine 10 of FIG. 1 is enabled in which the common or universal stator-inverter assembly 12 and TPIM 17 may be used with multiple rotor technologies to address performance, efficiency, and/or cost constraints across different platforms. For instance, a method may include constructing, sourcing, or otherwise providing a stator-inverter assembly configured to receive, in different configurations of the rotary electric machine 10 of FIG. 1, a rotor 14 selected from the above-noted inventory of differently preconfigured rotors 14A-14D. The method may include selecting the rotor 14A, 14B, 14C, or 14D from the inventory of preconfigured rotors 14 and thereafter installing the selected rotor 14 radially within the stator 16 of FIG. 2 to thereby construct the rotary electric machine 10 having the predetermined power and torque capability.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A universal modular stator-inverter assembly for a polyphase rotary electric machine, the universal modular stator-inverter assembly comprising:
   a stator having:
      a cylindrical stator core defining a center cavity and the stator core including a stator yoke, wherein the stator yoke includes a longitudinal center axis, an inner diameter ("ID"), and an outer diameter ("OD");
      electrical conductors collectively forming stator windings for each of a plurality of electrical phases of the electric machine;
      multiple stator teeth connected to the ID of the stator yoke, radially extending within the center cavity toward the center axis, and collectively defining a plurality of stator slots occupied by the stator windings, wherein each adjacent pair of the stator teeth defines a respective one of the stator slots, and each of the stator slots extends between a closed end of the respective stator slots and an open end of the respective stator slots, wherein the stator presents a first layer disposed adjacent to the closed end of the stator slots and a second layer disposed adjacent to the open end of the stator slots; and
      wherein each of the stator teeth include a pair of side walls that are linear and taper toward the center cavity such that each of the stator slots present a pair of sides that are linear and taper from the closed end of the respective stator slots to the open end of the respective stator slots, wherein each of the stator slots narrow as the respective stator slots extend from the first layer at the closed end to the second layer at the open end;
   a traction power inverter module ("TPIM") electrically connected to the stator windings and configured to deliver a polyphase voltage to the stator windings to thereby generate a predetermined number of magnetic poles, such that the stator has two, three, or four of the stator slots per electric phase of the electric machine per magnetic pole of the stator; and
   wherein the stator of the universal modular stator-inverter assembly has a universal configuration in which the center cavity of the stator core receives a rotor that is selected from an inventory of differently preconfigured rotors, wherein the differently preconfigured rotors each have an outer diameter that is the same as each other such that any one of the differently preconfigured rotors is insertable into the center cavity of the stator core, and the selected rotor provides the electric machine with a predetermined power and torque capability, such that the universal modular stator-inverter assembly is configured to be shared in common by the differently preconfigured rotors, and wherein the inventory of the differently preconfigured rotors includes a plurality of synchronous reluctance machine ("SynRM") rotors and an induction machine ("IM") rotor, wherein the SynRM rotors provides the electric machine with two, three, or four flux barrier layers.

2. The universal modular stator-inverter assembly of claim 1, wherein the predetermined number of the magnetic poles is at least six.

3. The universal modular stator-inverter assembly of claim 2, wherein the stator has fifty-four of the stator slots.

4. The universal modular stator-inverter assembly of claim 1, wherein the OD of the stator is 150 mm-200 mm, the ID of the stator is 90 mm-140 mm, and wherein the stator and each of the rotors in the inventory of the differently preconfigured rotors has an axial length of 75 mm-150 mm.

5. The universal modular stator-inverter assembly of claim 1, wherein the plurality of SynRM rotors includes a permanent magnet ("PM")-assisted SynRM rotor having high-energy rotor magnets constructed from Neodymium Iron Boron or Samarium Cobalt, a PM-assisted SynRM rotor having low-energy rotor magnets constructed from Ferrite, and a magnetless SynRM rotor.

6. The universal modular stator-inverter assembly of claim 5, wherein with respect to the PM-assisted SynRM rotor having the high-energy rotor magnets, the high-energy rotor magnets include first and second sets of interior permanent magnets forming two trapezoidal flux barrier layers, the first set of interior permanent magnets is tangentially arranged with respect to the outer diameter of the PM-assisted SynRM rotor, and the second set of interior permanent magnets extends between an inner diameter of the PM-assisted SynRM rotor and the outer diameter of the PM-assisted SynRM rotor to form a plurality of V-configurations or delta magnet configurations; and adjacent magnets of the second set of interior permanent magnets together define a V-angle of 5° to 10°, with distal ends of the adjacent magnets being separated from each other by a distance of 5 mm-15 mm.

7. The universal modular stator-inverter assembly of claim 5, wherein with respect to the PM-assisted SynRM rotor with low-energy rotor magnets, the low-energy rotor magnets include three one-piece block magnets stacked with respect to and separated from each other in a radial direction between inner and outer diameters of the PM-assisted SynRM rotor with the low-energy rotor magnets to form multiple three-layer flux barriers; and innermost magnets of an adjacent pair of the one-piece block magnets define a V-angle of 5° to 10°, with distal ends of the adjacent pair being separated from each other by between 5 mm-15 mm.

8. The universal modular stator-inverter assembly of claim 5, wherein the magnetless SynRM rotor includes a rotor shaft and four flux barrier layers, the four flux barrier layers being defined by:

a star-shaped rotor core mounted to the rotor shaft and including six triangular members, each of the triangular members being mounted to and extending radially away from the rotor shaft, wherein the rotor core defines airgaps between each adjacent pair of the triangular members; and three trapezoidal-shaped rotor bars of progressively-decreasing size and circumferential span disposed in the airgaps between each of the adjacent pairs of the triangular members, with the rotor bars being separated from each other by the airgaps, such that each one of the triangular members tapers toward the outer diameter of the magnetless SynRM rotor to a width of at least 3 mm and less than 8 mm.

9. The universal modular stator-inverter assembly of claim 5, wherein the IM rotor includes at least sixty-two rotor bars constructed of aluminum or copper, equally-spaced from each other around a perimeter of the IM rotor and extending along an axis of the IM rotor, wherein each of the rotor bars is 2 mm-4 mm in width direction around the perimeter, 15 mm-20 mm in depth direction along a radial direction of the IM rotor, and 70 mm-150 mm in length along the axis of the IM rotor.

10. The universal modular stator-inverter assembly of claim 1, wherein the stator has fifty-four of the stator slots and six of the magnetic poles, and the stator has the first layer and the second layer with three turns per coil or stator winding, two parallel paths, and a throw of nine of the stator slots.

11. The universal modular stator-inverter assembly of claim 1, wherein the TPIM has a universal configuration compatible with each of the differently preconfigured rotors, and wherein the TPIM is electrically connected to the stator having the universal configuration.

12. A rotary electric machine comprising:
a universal modular stator-inverter assembly for a polyphase rotary electric machine, the universal modular stator-inverter assembly comprising:
a stator having:
a cylindrical stator core defining a center cavity and the stator core including a stator yoke, wherein the stator yoke includes a longitudinal center axis, an inner diameter ("ID"), and an outer diameter ("OD");
electrical conductors collectively forming stator windings for each of a plurality of electrical phases of the electric machine;
multiple stator teeth connected to the ID of the stator yoke, extending radially toward the longitudinal center axis and center cavity, and collectively defining a plurality of stator slots occupied by the stator windings, wherein each adjacent pair of the stator teeth defines a respective one of the stator slots, and each of the stator slots extends between a closed end of the respective stator slots and an open end of the respective stator slots, wherein the stator presents a first layer disposed adjacent to the closed end of the stator slots and a second layer disposed adjacent to the open end of the stator slots;
wherein each of the stator teeth include a pair of side walls that are linear and taper toward the center cavity such that each of the stator slots present a pair of sides that are linear and taper from the closed end of the respective stator slots to the open end of the respective stator slots, wherein each of the stator slots narrow as the respective stator slots extend from the first layer at the closed end to the second layer at the open end;
a traction power inverter module ("TPIM") electrically connected to the stator windings and configured to deliver a polyphase voltage to the stator windings to thereby generate a predetermined number of magnetic poles, such that the stator has either two, three, or four of the stator slots per electric phase of the electric machine per magnetic pole of the stator; and a rotor providing the electric machine with two, three, or four flux barrier layers and a predetermined power and torque capability, and wherein the stator has a universal configuration in which the center cavity of the stator core receives the rotor that is selected from an inventory of differently preconfigured rotors, wherein the differently preconfigured rotors each have an outer diameter that is the same as each other such that any one of the differently preconfigured rotors is insertable into the center cavity of the stator core, and each of the differently preconfigured rotors are configured to operate radially within the stator and provide the electric machine with the predetermined power and torque capability, such that the universal modular stator-inverter assembly is configured to be shared in common by the differently preconfigured rotors, the inventory of the differently preconfigured rotors including a plurality of synchronous reluctance machine ("SynRM") rotors and an induction machine ("IM") rotor, wherein the SynRM rotors provides the electric machine with the two, three, or four flux barrier layers.

13. The rotary electric machine of claim 12, wherein the stator has six of the magnetic poles and fifty-four of the stator slots, the OD of the stator is 150 mm-200 mm, the ID of the stator is 90 mm-140 mm, and the stator and each of the rotors in the inventory of the differently preconfigured rotors has an axial length of 75 mm-150 mm.

14. The rotary electric machine of claim 12, wherein the rotor is one of the plurality of SynRM rotors and includes a permanent magnet ("PM")-assisted SynRM rotor having high-energy rotor magnets constructed from Neodymium Iron Boron or Samarium Cobalt, the high-energy rotor magnets including first and second sets of interior permanent magnets forming two trapezoidal flux barrier layers, the first set of interior permanent magnets is tangentially arranged with respect to the outer diameter of the PM-assisted SynRM rotor, and the second set of interior permanant magnets extends between an inner diameter of the PM-assisted SynRM rotor and the outer diameter of the PM-assisted SynRM rotor to form a plurality of V-configurations or delta magnet configurations; and adjacent magnets of the second set of interior permanent magnets together define a V-angle of 5° to 10°, with distal ends of the adjacent magnets being separated from each other by a distance of 5 mm-15 mm.

15. The rotary electric machine of claim 12, wherein the rotor is one of the plurality of SynRM rotors and includes a PM-assisted SynRM rotor having low-energy rotor magnets constructed from Ferrite, the low-energy rotor magnets include three one-piece block magnets stacked with respect to and separated from each other in a radial direction between inner and outer diameters of the PM-assisted SynRM rotor with the low-energy rotor magnets to form multiple three-layer flux barriers; and innermost magnets of an adjacent pair of the one-piece block magnets define a V-angle of 5° to 10°, with distal ends of the adjacent pair being separated from each other by between 5 mm-15 mm.

16. The rotary electric machine of claim 12, wherein the rotor is one of the plurality of SynRM rotors and includes a magnetless SynRM rotor that includes a rotor shaft and four flux barrier layers, the four flux barrier layers being defined by:

a star-shaped rotor core mounted to the rotor shaft and including six triangular members, each of the triangular members being mounted to and extending radially away from the rotor shaft, wherein the rotor core defines airgaps between each adjacent pair of the triangular members; and three trapezoidal-shaped rotor bars of progressively-decreasing size and circumferential span disposed in the airgaps between each of the adjacent pairs of the triangular members, with the rotor bars being separated from each other by the airgaps, such that each one of the triangular members tapers toward the outer diameter of the magnetless SynRM rotor to a width of at least 3 mm and less than 8 mm.

17. The rotary electric machine of claim 12, wherein the rotor is the IM rotor and includes at least sixty-two rotor bars equally-spaced from each other around a perimeter of the IM rotor and extending along an axis of the IM rotor, wherein each of the rotor bars is 2 mm-4 mm in width direction around the perimeter, 15 mm-20 mm in depth direction along a radial direction of the IM rotor, and 70 mm-150 mm in length along the axis of the IM rotor.

18. The rotary electric machine of claim 12, wherein the stator has fifty-four of the stator slots, six of the magnetic poles, and the first layer and the second layer with three turns per coil or stator winding, two parallel paths, and a throw of nine of the stator slots.

19. A method for constructing a polyphase rotary electric machine, the method comprising:

providing a universal modular stator-inverter assembly that is configured to receive, in different respective configurations of the rotary electric machine, a rotor selected from an inventory of differently preconfigured rotors each providing the rotary electric machine with a predetermined power and torque capability, the universal modular stator-inverter assembly having:

a stator, including:

a cylindrical stator core defining a center cavity and the stator core including a stator yoke, wherein the stator yoke includes a longitudinal center axis, an inner diameter ("ID") of 90 mm-140 mm, and an outer diameter ("OD") of 150 mm-200 mm, and an axial length of 75 mm-150 mm;

wherein the stator has a universal configuration in which the center cavity of the stator core receives one of the differently preconfigured rotors that is selected from the inventory, wherein the differently preconfigured rotors each have an outer diameter that is the same as each other such that any one of the differently preconfigured rotors is insertable into the center cavity of the stator core;

electrical conductors collectively forming stator windings for each of a plurality of electrical phases of the rotary electric machine;

multiple stator teeth connected to the ID of the stator yoke, extending within the center cavity radially toward the longitudinal center axis, and collectively defining a plurality of stator slots occupied by the stator windings, wherein each adjacent pair of the stator teeth defines a respective one of the stator slots, and each of the stator slots extends between a closed end of the respective stator slots and an open end of the respective stator slots, wherein the stator presents a first layer disposed adjacent to the closed end of the stator slots and a second layer disposed adjacent to the open end of the stator slots; and wherein each of the stator teeth include a pair of side walls that are linear and taper toward the center cavity such that each of the stator slots present a pair of sides that are linear and taper from the closed end of the respective stator slots to the open end of the respective stator slots, wherein each of the stator slots narrow as the respective stator slots extend from the first layer at the closed end to the second layer at the open end;

a traction power inverter module ("TPIM") electrically connected to the stator windings and configured to deliver a polyphase voltage to the stator windings to thereby generate a predetermined number of magnetic poles, such that the stator has either two, three, or four of the stator slots per electric phase of the rotary electric machine per magnetic pole of the stator;

selecting the rotor from the inventory of the differently preconfigured rotors, as a selected rotor, wherein the inventory of the differently preconfigured rotors includes a plurality of synchronous reluctance machine ("SynRM") rotors and an induction machine ("IM") rotor, with the SynRM rotors providing the rotary electric machine with two, three, or four flux barrier layers; and installing the selected rotor radially within the stator to thereby construct the rotary electric machine having the predetermined power and torque capability.

20. The method of claim 19, wherein the stator has six of the magnetic poles and fifty-four of the stator slots.

* * * * *